J. SCHIES.
MACHINERY FOR MANUFACTURING GLASSWARE.
APPLICATION FILED NOV. 14, 1908.
1,046,867.
Patented Dec. 10, 1912.
3 SHEETS—SHEET 3.
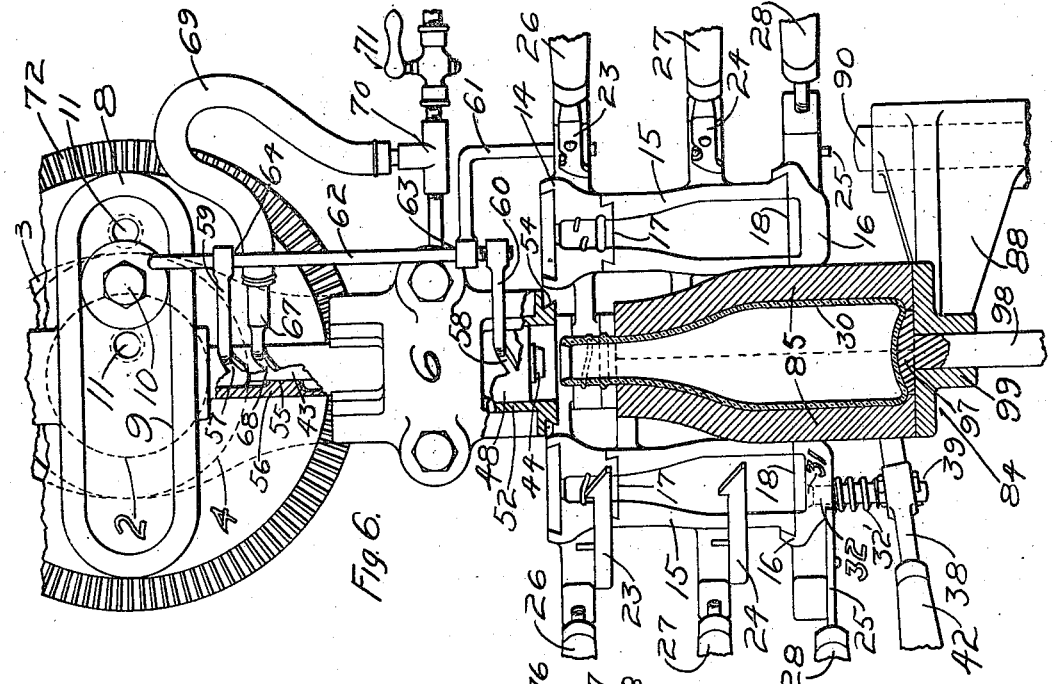
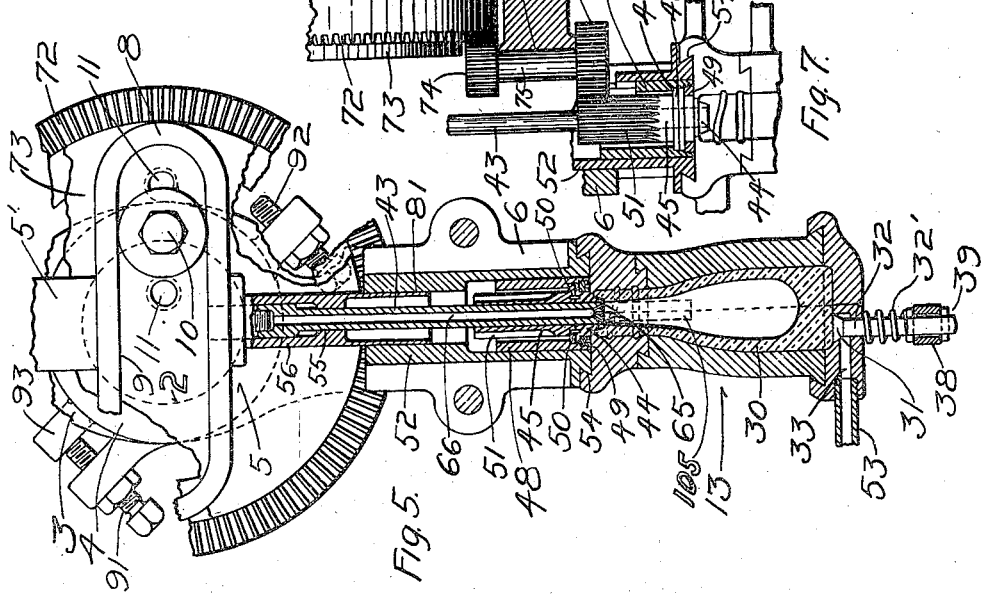

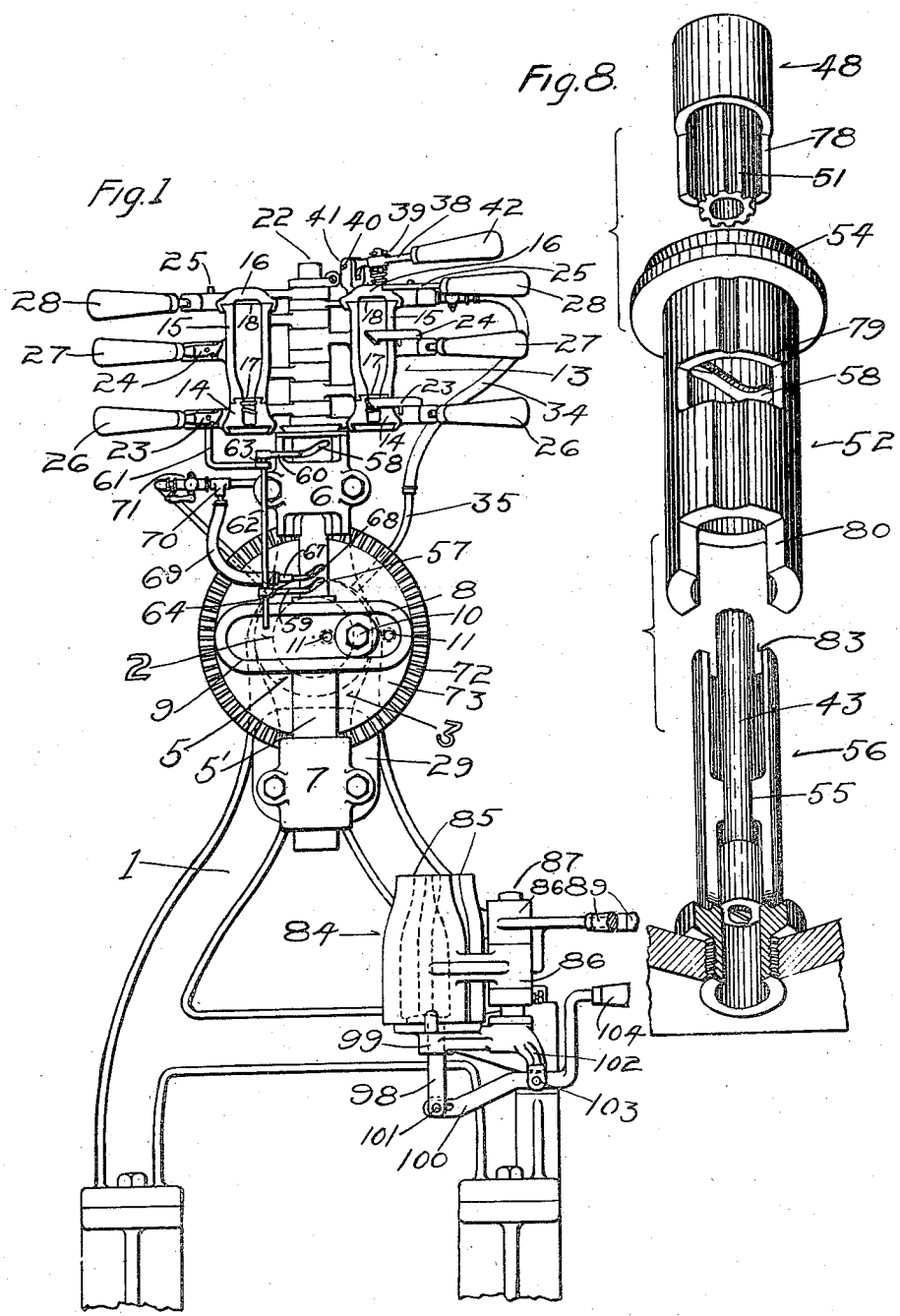

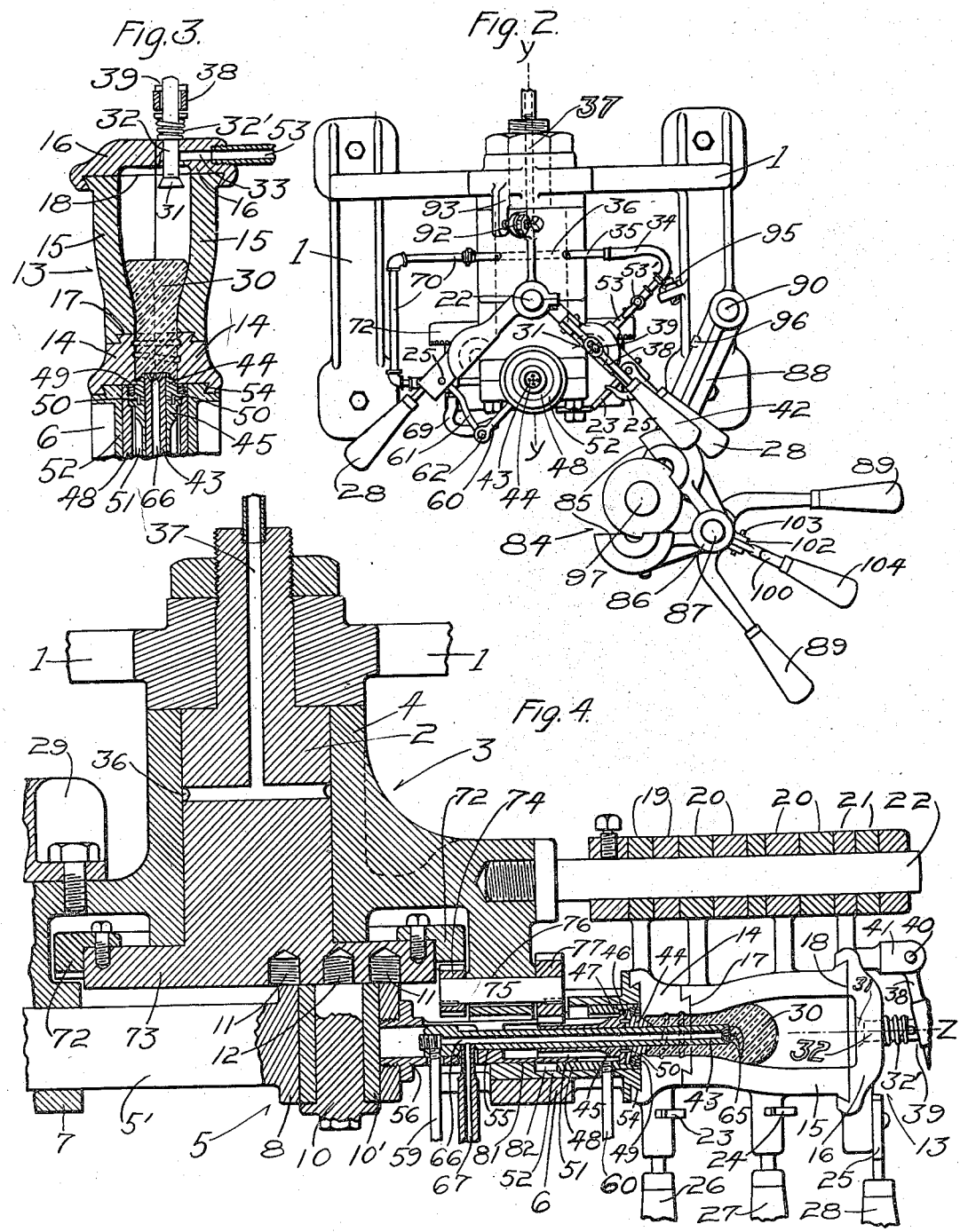

UNITED STATES PATENT OFFICE.

JOHN SCHIES, OF ANDERSON, INDIANA.

MACHINERY FOR MANUFACTURING GLASSWARE.

1,046,867.   Specification of Letters Patent.   Patented Dec. 10, 1912.

Application filed November 14, 1908. Serial No. 462,707.

*To all whom it may concern:*

Be it known that I, JOHN SCHIES, a citizen of the United States, residing at Anderson, in the county of Madison and State of Indiana, have invented certain new and useful Improvements in Machinery for Manufacturing Glassware, of which the following is a specification.

My invention relates to machinery for manufacturing glassware, and is especially applicable for manufacturing bottles or jars, or similar hollow vessels, and by its employment narrow-neck vessels are capable of being readily made.

My invention consists in providing an apparatus of this character in which the parison or blank of glass metal is forced against the neck-mold parts prior to being blown into hollow form, further, in providing novel means for forming the mouth of the vessel; further, in mechanism whereby the parison or blank is provided with an initial opening at the neck and then blown into a primary hollow glass article of plastic glass-metal preparatory to being finally blown to shape; and further in novel means for operating the plunger and mouth-ring.

In manufacturing hollow glassware, the glass metal must be operated upon promptly after being received from the melting-pot or tank. The operations upon the glass-metal must proceed in rapid sequence so as to avoid chilling of the metal and for producing the best article, and I provide means whereby the operation of the plunger and the rotation of the mouth-ring may be performed automatically, thus relieving the operator of attention to these parts and enabling a more perfect article to be produced.

My invention, in the exemplification represented in the drawings, contemplates an apparatus which may be swung about an axis and is arranged to support a primary or initial mold which may also be termed a parison-mold, in inverted relation when in upper position, which is arranged to be swung into upright relation when in lowermost position, a plunger acting upon the glass-metal in the said mold during the transfer thereof from the inverted to the upright position, during which movement suitable rotation may also be imparted to the mouth-ring for forming a mouth on the vessel which is smooth and so that danger of sticking of the glass-metal to the ring may be avoided.

The invention also contemplates means whereby the primary mold may be a primary or initial blow-mold which may be released from the partly blown vessel, which latter remains suspended from the neck mold, while a finishing blow-mold is received about the partly blown vessel while so suspended, and the blowing operation then completed.

The invention will be further readily understood from the following description and claims, and from the drawings, in which latter:

Figure 1 is a front elevation of my improved device, showing the primary mold in uppermost position and in open relation, and showing the finished blow-mold also in open relation. Fig. 2 is a plan view of my improved device. Fig. 3 is a longitudinal section of the primary mold on a line corresponding to the line $z$ of Fig. 4, said primary mold being assumed in inverted relation and closed, with a glass-blank therein, and showing the outer valve open for forcing the plastic glass into the neck-mold, and showing the relation of the plunger when said mold is in inverted relation. Fig. 4 is a longitudinal section of the housing on the line $y$—$y$ of Fig. 2, showing the housing however in horizontal position, with the housing and plunger in the relation they assume in such horizontal position, also showing the primary mold in closed relation. Fig. 5 is a longitudinal section of the primary mold on a line corresponding to the line $z$ of Fig. 4, showing said mold in upright relation and the plunger in the position it assumes in such upright relation. Fig. 6 is a front elevation partly broken away and partly in section on a line corresponding to the line $z$ of Fig. 4, showing the finishing blow-mold in section on said line and in position under the plunger, with the primary mold open and the plunger and mouth-ring retracted for permitting release of the finished bottle. Fig. 7 is a detail in side elevation, partly in section on the line y—y of Fig. 2, showing the driving means between the stationary rack and the mouth-ring; and, Fig. 8 is a rear isometric view of the mouth-ring, the positioning-ring sleeve, and the plunger-shell, partly broken away, showing the recesses therein for permitting longitudinal movement.

1 represents a suitable frame on which there is a trunnion 2.

3 is a housing or a support which has a bearing 4 about the trunnion.

5 is a reciprocating member or pitman movable longitudinally in the housing. Bearings 6 7 are provided for permitting this longitudinal movement. The pitman comprises a yoke 8 in which there is a transverse slot 9, with the walls of which a crank 10 on the frame is arranged to engage. The crank may have an anti-friction roller 10' thereon. The crank is preferably adjustable with relation to the axis of the housing, as by means of providing a series of threaded apertures 11 into any one of which the threaded end 12 of the crank is arranged to be received. The distance of the crank from the oscillatory axis of the housing determines the extent of longitudinal travel of the pitman. Thus it will be noted that when the housing is in vertical position with the primary mold either in inverted or upright position, (see Figs. 1, 5, and 6), the position of the slot is coincident with that of the axis of the housing, but when the housing is in reclining position, (see Fig. 4), the slot is distanced from the said axis, resulting in longitudinal movement of the pitman, the extent of movement being determined by the position of the crank with relation to the axis of the housing. The pitman may have an extension 5' slidable in the bearing 7.

13 represents a parison-mold, shown as a primary blow-mold, and in the form shown comprises the divided sections 14 of a neck-mold, the divided sections 15 of a body-mold, and the divided sections 16 of a bottom-mold, these molds having joints 17 and 18 between them. These mold-sections are respectively pivoted by the bearings 19, 20, and 21 on a post 22 suitably secured to the housing. Suitable latches, shown at 23, 24 and 25 are provided on the respective mold-sections for securing the mold-sections in closed relation while the glass-parison in the mold is being operated upon. The respective sections may also be provided with handles 26 27 and 28 for moving the same, and they may be separate from the arms on which they swing, if desired. In the form shown the mold is in inverted position when at the top of the housing and in upright position when the housing is turned for bringing the mold to the bottom of the housing. The mold is arranged to swing with the housing, and the housing may be provided with a counter weight 29 for counterbalancing the mold.

30 represents the glass-parison or blank. For causing the glass-blank to intimately contact the neck-mold as well as the mouth-ring and plunger-end hereinafter mentioned, I provide means for directing a charge of fluid under pressure against the end of the blank opposite the neck-mold. For this purpose I have shown the bottom-mold provided with a valve 31, the inner end of the valve-stem of which when closed is preferably flush with the inner face of said mold, being closed by a spring 32'. A bore 33 in said mold communicates with said valve and with a pipe 53, having a valve 53' therein. The pipe 53 connects with a flexible tube 34 which has connection with a pipe 35 having communication with an annular passage 36 between the trunnion and bearing of the housing, a bore 37 in the trunnion having suitable connection with said annular passage and a source of fluid under pressure. Other connection may however be employed. A lever 38 is articulated with the valve-stem at 39, being pivoted at 40 to a lug 41 on the mold and having a handle 42 for its operation.

43 is a plunger. It is shown coincident in position with the longitudinal axis of the mold when the latter is closed. It is moved longitudinally by the pitman, and swings with the housing in the movement of the latter. Longitudinal movement and rocking movement about its axis with relation to its pitman are also preferably imparted to it.

44 is a mouth-ring in which the plunger has longitudinal movement. This mouth-ring is shown as comprising a sleeve 45 from which it may be releasable. The mouth-ring is preferably rotatable, and for the purpose a flange 46 is provided therefor journaled in an annular recess 47 of a sleeve 48, a collar 49 holding the flange against longitudinal movement with relation to the sleeve. The collar 49, with pins 50, may also hold the releasable mouth-ring to the sleeve. The sleeve 45 is shown provided with an elongated gear 51. The sleeve 48 is rockable in a sleeve 52, which forms a bearing therefor, the sleeves 52 being clamped in a bearing 6. The sleeve 52 may have a positioning-ring 54 for the neck-mold thereon. The plunger may also be supported in a bearing 55 of a shell 56 of the pitman, and have longitudinal movement in this bearing. The mouth-ring and outer end of the plunger preferably extend into the transverse plane of the neck-mold or beyond the positioning-ring 54, when the neck-mold is closed, but means are provided for withdrawing the same into the positioning-ring when the vessel has been blown for permitting removal of the latter. For accomplishing this I prefer to provide the shell of the pitman with a cam-slot 57, and the sleeve 48 with a cam-slot 58. Rods 59 60 are secured respectively to said plunger and sleeve and extend through said slots, being guided by the walls thereof. A bracket 61 extends from the arm of one of the neck-mold sections. A rod 62 is secured to the rod 60. The bracket 61 and rod 59 respectively having eyes 63 64 received loosely about the rod 62 so that the said rods 59 60 may be moved by said bracket in said cam-slots for causing said plunger and mouth-ring to protrude into the transverse plane of the forming part of said neck-mold when said neck-mold is closed, and to be withdrawn outside said plane when said neck-mold is opened.

The plunger is preferably provided with an aperture or apertures 65, which communicate with a bore 66 extending longitudinally of the plunger, through which and the aperture or apertures air or other fluid under pressure is arranged to be introduced into the body of the glass-parison or blank for blowing the same. A pipe 67 may communicate with the bore 66 and be secured to the plunger and pass through a slot 68 in the pitman-shell, a flexible tube 69 connecting the pipe 67 with a pipe 70 in which there is a valve 71, the pipe 70 having communication with the annular passage 36. Other connections may however be employed.

For causing rotation of the mouth-ring I have shown a circular rack 72 secured to the flange 73 of the trunnion 2, a pinion 74 meshing with said rack, the rack being stationary, said pinion being on a shaft 75 journaled in a bearing 76 of the housing, the shaft 75 having a gear 77 thereon which meshes with the elongated gear 51 formed on the mouth-ring sleeve and maintains said mesh throughout the longitudinal movements of the mouth-ring. The sleeve 48 has a recess 78 through which gear 77 extends to the longitudinal gear, this recess permitting longitudinal and rocking movement of said sleeve 48. The gear 77 also extends through a slot 79 in a sleeve 52. Sleeve 52 also has a recess 80 for accommodating the pinion 74.

The pitman-shell 56 has bearing in the sleeve 52, as shown at 81, and its outer end is received and is arranged to reciprocate between said sleeve and the sleeve 45, sleeve 48 being received in an annular recess 82 of the sleeve 52. The rear part of the shell 56 has a slot 83 for accommodating the gear 77 in the longitudinal movements of said shell.

84 is a finishing blow-mold shown as comprising the halves 85 on bearings 86 on a post 87 mounted on a swinging arm 88, the said halves of the finishing blow-mold being provided with handles 89. The swinging arm is pivoted on a post 90 in the frame.

The housing is arranged to be swung so that the primary mold is in either inverted or depending position. It is provided with set-screws 91 92 arranged to alternately strike on reverse sides of a lug 93 on the frame for forming stops, shown adjustable, for definitely positioning the primary mold in either position. When in depending position, the body and bottom sections of this mold are arranged to be opened for permitting the finishing mold to be received about the partly finished vessel depending from the neck-mold. The frame is shown provided with a set-screw 95 adapted to be engaged by the lug 96 on the arm for adjustably limiting the movement of the finishing mold with relation to the housing.

The finishing mold may have a movable bottom 97 shown mounted on a stem 98 in a bearing 99 of the arm 88. A lever 100 is articulated with the stem at 101 and is pivoted to the depending lug 102 of said arm at 103, and has a handle 104 for operating the bottom when it is desired to manipulate the same for supporting the partially blown vessel or for loosening or raising the finished vessel, shown at 30', with relation to the finishing blow-mold.

In operation, the housing is so turned as to swing the primary mold in inverted position at its top. The neck-mold and body-mold are closed, the bottom-mold being open, and a glass blank is introduced into the primary mold. The bottom-mold thereof is then closed, and the valve 31 is operated for introducing a charge of fluid under pressure against the top of the glass-parison for forcing the glass thereof into intimate contact with the inner face of the neck-mold and with the mouth-ring and outer end of the plunger, as illustrated in Fig. 3. The housing is then swung about the trunnion, which causes the plunger to enter the parison as illustrated in Fig. 4, which shows the mold in horizontal position, and, while being so swung, the pinion 74 travels along the rack 72 and causes turning of the mouth-ring. Continuing the swinging of the housing causes retraction of the plunger, as shown in Fig. 5. The retraction of the plunger leaves a cavity, indicated at 105 in Fig. 5, in the neck end of the glass-blank, and a charge of air under pressure is then introduced into the blank, in this instance through the plunger, which blows the blank into a hollow blank of plastic glass, and partly blows the vessel. The body-mold and the bottom mold of the primary mold are then opened, which leaves the partly-blown vessel suspended in position from the neck-mold in the plastic condition. The finishing blow-mold is then swung into position around the partly blown vessel, and a further charge of air under pressure is introduced into the partly formed vessel for blowing the same into shape against the inner surface of the finishing blow-mold. The neck-mold is then opened, which retracts both the plunger and the mouth-ring beyond the top of the completely blown vessel, (see Fig. 6), and the neck-mold is opened, which permits the completely blown vessel to be moved laterally away from the primary mold. The finishing blow-mold is then opened and the blown vessel is removed.

It is of course obvious that changes may be made in the mechanism hereinbefore described without departing from the spirit of my invention.

Having thus fully described my invention what I claim as new and desire to secure by Letters Patent is:

1. In a machine for making hollow glassware, the combination of a mold for receiving the glass-blank, a plunger and a mouth-ring, said mouth-ring rotatable with relation to said plunger, and connected driving means for longitudinally moving said plunger and for rotating said mouth-ring relatively to said mold and plunger.

2. In a machine for manufacturing hollow glassware, the combination of a neck-mold, a mouth-ring, and means for automatically rotating said mouth-ring relatively to said neck mold while said mouth-ring is maintained in the same longitudinal position with relation to said neck-mold.

3. In a machine for manufacturing hollow glassware, the combination of a neck-mold, a mouth-ring, a plunger longitudinally operable in said mouth-ring, means for rotating said mouth-ring with relation to said plunger and said neck-mold, and means for fixing said mouth-ring longitudinally with relation to said neck-mold during rotation thereof.

4. In a machine for manufacturing hollow glass-vessels, the combination of a mold comprising a neck-mold, a rotatable mouth-ring for the mouth of said vessel, means for rotating said mouth-ring relatively to said mold, and means for maintaining said mouth-ring in its position lengthwise of its axis with relation to said neck-mold while being so rotated, substantially as described.

5. In a machine for manufacturing hollow glass-vessels, the combination of a mold comprising a neck-mold, a rotatable mouth-ring for the mouth of said vessel, means for rotating said mouth ring relatively to said mold, means for maintaining said mouth-ring in its position lengthwise of its axis with relation to said neck-mold while being so rotated, a plunger, and means for moving said plunger longitudinally in said mouth-ring, substantially as described.

6. In a machine for manufacturing hollow glassware, the combination of a sectional mold comprising a neck-mold, a movable support for said mold, a rotatable mouth-ring for said neck-mold, a plunger in said mouth-ring, means connected with a mold-section for moving said plunger lengthwise upon movement of said mold section, and means connected with said mouth-ring for rotating said mouth-ring upon movement of said support.

7. In a machine for manufacturing hollow glassware, the combination of a pivoted support, an initial blow-mold therein comprising a neck-mold, a pitman having longitudinal movement on said support and comprising a plunger, a crank having connection therewith, means for introducing fluid under pressure against the glass-blank in said initial blow-mold for forcing the glass thereof against said plunger, said support being permitted to swing, whereby said plunger is forced into the glass of said glass-blank, and means for introducing fluid under pressure into said glass-blank upon retraction of said plunger.

8. In a machine for manufacturing hollow glassware, the combination of a mold comprising a neck-mold, a movable support for said mold, a mouth-ring for said mold, and rotating means for said mouth ring having connection with said support for automatically rotating said mouth-ring relatively to said neck mold upon the movement of said support.

9. In a machine for manufacturing hollow glassware, the combination of a mold comprising a neck-mold, a movable support for said mold, a frame on which said support is mounted, a mouth-ring and a plunger for said mold, means for holding said mold fixed to said support and permitting said mouth-ring to rotate relatively to said support and mold, and means having driving connection with said frame for automatically rotating said mouth-ring relatively to said neck mold and support and reciprocating said plunger upon the movement of said support.

10. In a machine for manufacturing hollow glassware, the combination of a separable mold comprising a neck-mold, a pivoted support for said mold, a mouth-ring journaled in said support and rotatable relatively to said mold and having a rotary axis coincident with the longitudinal axis of said mold, and means for automatically rotating said mouth-ring relatively to said mold upon the swinging of said pivoted support, substantially as described.

11. In a machine for manufacturing hollow glassware, the combination of a mold comprising a neck-mold, a pivoted support on which said mold is mounted, a frame on which said support is pivoted, a mouth-ring journaled in said support and in operative relation rotatable relatively to said mold and means on said pivoted support connecting with said mouth-ring and frame for automatically rotating said mouth-ring relatively to said mold by the swinging of said support upon its pivot, substantially as described.

12. In a machine for manufacturing hollow glassware, the combination of a movable mold, a mouth-ring therefor, a plunger movable longitudinally therein, and connected means having operative connection with said mouth ring and plunger for simultaneously rotating said mouth-ring relatively to said mold and moving said plunger longitudinally in said mouth-ring, substantially as described.

13. In a machine for manufacturing hollow glassware, the combination of a rockable support, a reciprocating member on said rockable support, a plunger on said reciprocating member, means for moving said reciprocating member and plunger simultaneously longitudinally of said plunger by the rocking of said rockable support and means for moving said plunger longitudinally independently of said reciprocating member.

14. In a machine for manufacturing hollow glassware, the combination of a rockable support, a mold rockable therewith, a plunger for said mold rockable with said support, means for moving said plunger longitudinally on said rockable support by the rocking of said rockable support, and means for moving said plunger longitudinally independent of said rocking of said support.

15. In a machine for manufacturing hollow glassware, the combination of a rockable support, a mold rockable therewith, a mouth-ring, a plunger movable longitudinally therein, said plunger and mouth-ring rockable with said support, means for moving said plunger longitudinally in said mouth-ring by the rocking of said support, and means for moving said plunger and mouth-ring longitudinally independent of the rocking of said support.

16. In a machine for manufacturing hollow glassware, the combination of a rockable support, a mold rockable therewith, a mouth-ring, a plunger movable longitudinally therein, said plunger and mouth-ring rockable with said support, means for moving said plunger longitudinally in said mouth-ring and rotating said mouth-ring by the rocking of said support, and means for moving said plunger and mouth-ring longitudinally independent of the rocking of said support.

17. In a machine for manufacturing hollow glassware, the combination of a rockable support, a pitman therefor, a plunger on said pitman, a mouth-ring rotatable about said plunger, a sleeve in which said mouth-ring is journaled, and means for moving said plunger longitudinally in said mouth-ring and said pitman toward said mouth-ring by the rocking of said support.

18. In a machine for manufacturing hollow glassware, the combination of a rockable support, a pitman therefor, a plunger on said pitman, a mouth-ring rotatable about said plunger, a sleeve in which said mouth-ring is journaled, a bearing-piece for said sleeve, and means for moving said plunger longitudinally in said mouth-ring and said pitman toward said mouth-ring by the rocking of said support.

19. In a machine for manufacturing hollow glassware, the combination of a rockable support, a pitman therefor, a plunger on said pitman, a mouth-ring rotatable about said plunger, a sleeve in which said mouth-ring is journaled, a bearing-piece for said sleeve, and means for moving said plunger longitudinally in said mouth-ring and said pitman toward said mouth-ring by the rocking of said support, the said bearing-piece and sleeve and the said pitman and plunger respectively having cam-faces and contact-parts therefor for moving said mouth-ring and plunger longitudinally independent of said rocking of said support.

20. In a machine for manufacturing hollow glassware, the combination of a frame, a rockable support, a mold and a plunger therefor on said support, and adjustable means between said plunger and frame for causing the reciprocation and controlling the extent of reciprocation of said plunger.

21. In a machine for manufacturing hollow glassware, the combination of a plurality of blow-molds of successively increasing interior dimensions, and comprising a neck-mold and a primary blow-mold having an end-portion, said primary blow-mold being arranged to receive a glass-blank, simultaneously operable plunger and pressure means, said plunger arranged to be received into said glass-blank from the neck-end thereof and said pressure-means acting for forcing fluid under pressure into said primary blow-mold between said glass-blank and said end-portion, and means for injecting fluid under pressure through said neck-mold into the cavity formed in said glass-blank by said plunger for expanding said glass-blank against the interior walls of said successive blow-molds, substantially for the purpose described.

In testimony whereof, I have signed my name hereto in the presence of two subscribing witnesses.

JOHN SCHIES.

Witnesses:
 CONSTANT SOUTHWORTH,
 LILLIAN BURNETT.